United States Patent
Ramprasad et al.

(10) Patent No.: US 6,535,959 B1
(45) Date of Patent: Mar. 18, 2003

(54) CIRCUIT AND METHOD FOR REDUCING POWER CONSUMPTION IN AN INSTRUCTION CACHE

(75) Inventors: Sumant Ramprasad, Santa Ana, CA (US); Sameer I. Bidichandani, Tustin, CA (US)

(73) Assignee: Conexant Systems, Inc., Newport Beach, CA (US)

( * ) Notice: Subject to any disclaimer, the term of this patent is extended or adjusted under 35 U.S.C. 154(b) by 128 days.

(21) Appl. No.: 09/654,811

(22) Filed: Sep. 5, 2000

(51) Int. Cl.[7] .......................... G06F 12/06; G06F 13/00
(52) U.S. Cl. .......................... 711/125; 711/128; 711/5; 711/154; 713/320; 713/324
(58) Field of Search .................. 711/118, 128, 711/154, 125, 5; 713/320, 324

(56) References Cited

U.S. PATENT DOCUMENTS

| | | | | |
|---|---|---|---|---|
| 5,210,842 A | * | 5/1993 | Sood ........................ | 711/125 |
| 5,550,774 A | * | 8/1996 | Brauer et al. .......... | 365/189.02 |
| 5,577,223 A | * | 11/1996 | Tanoi et al ............ | 365/230.03 |
| 5,761,715 A | * | 6/1998 | Takahashi ................ | 711/128 |
| 5,845,309 A | * | 12/1998 | Shirotori et al. .......... | 711/3 |
| 5,860,127 A | * | 1/1999 | Shimazaki et al. ........ | 711/167 |
| 5,913,223 A | * | 6/1999 | Sheppard et al. .......... | 711/118 |
| 5,974,505 A | * | 10/1999 | Kuttanna et al. .......... | 711/118 |
| 6,345,336 B1 | * | 2/2002 | Takahashi ................ | 711/125 |

* cited by examiner

Primary Examiner—Glenn Gossage
(74) Attorney, Agent, or Firm—Farjami & Farjami LLP

(57) ABSTRACT

A circuit and method for reducing power in a memory, such as an instruction cache, having a number of blocks, are disclosed. A power reduction signal (also called a "same block" signal) is generated. The power reduction signal indicates whether a subsequent instruction to be fetched from an instruction cache belongs in the same block as a previous instruction fetched from the same instruction cache. When the subsequent instruction belongs to the same block as the previous instruction, there is no need to perform a tag read or an instruction read from an instruction cache other than the same instruction cache which contains the block to which the subsequent instruction belongs, whereby a tag from a tag memory bank is not read when the power reduction signal is in a first logical state.

13 Claims, 4 Drawing Sheets

CIRCUIT AND METHOD FOR REDUCING POWER CONSUMPTION IN AN INSTRUCTION CACHE

BACKGROUND OF THE INVENTION

1. Field of the Invention

The present invention is generally in the field of processors. More specifically, the invention is in the field of cache memories.

2. Background Art

As is generally known, computer programs continue to increase in size. As computer programs grow in size, the memory requirements of the computer and various memory devices also increase. However, as the size of a program currently residing in the computer's main memory (also referred to as the "external memory" in the present application) gets larger, the speed at which the processor executes tasks begins to decrease. This results from the constant fetching of instructions from the main memory of the computer into the processor (also referred to as a "Central Processing Unit" or "CPU"). The larger the program currently being used, the more often instructions must be fetched. This fetching process requires a certain number of clock phases. Therefore, the more often instructions have to be fetched from the main memory, the less time the processor has available to decode and execute those instructions and the slower the speed at which the processor can finish tasks.

Thus, it is desirable to set aside in a local memory, i.e. a memory requiring less access time than the main memory, a limited number of program instructions that the processor may want to fetch. An instruction cache is such a local memory. An instruction cache is a relatively small memory module where a limited number of program instructions may be stored.

The processor performs constant checks to determine whether instructions stored in the main memory required by the processor are already resident in the instruction cache. If they are already resident in the instruction cache, the instruction fetch step is performed by referring to the instruction cache, since there is no need to go to the main memory to find what is already in the instruction cache.

Thus, the processor must be able to determine if an instruction to be fetched from the main memory is already resident in the instruction cache. The processor's program counter contains the address of an instruction needed by the processor. One way to determine if an instruction is already resident in the instruction cache is to keep track of the addresses of the instructions when they are first brought into the instruction cache from the main memory. To do this, copies of certain upper bits of the instruction addresses (also referred to as the "instruction addresses" in the present application) are stored in a tag memory bank where each entry in the tag memory bank is referred to as a "tag." As an example, the upper 22 bits of a 34-bit instruction address can comprise the tag. These upper 22 bits of the 34-bit instruction address are referred to as a "tag," and the individual bits in the tag are referred to as "tag bits" in the present application.

When the processor wishes to determine whether a particular instruction is resident in the instruction cache, the address of the instruction is sent from the program counter across the address bus to the instruction cache and the tag memory bank. In the present example, the 22-bit tags within the tag memory bank and 32-bit wide instructions in the instruction cache are read. The upper 22 bits of address of the instruction contained in the program counter are then compared with a tag in the tag memory. If there is a match, also referred to as a "hit," the instruction is already resident in the instruction cache, and it is not necessary to fetch the instruction from the main memory. If there is no match, also referred to as a "miss," the instruction must be fetched from the main memory at the address contained in the program counter.

A "set-associative" cache consists of multiple sets, each set consisting of an instruction cache and a tag memory bank. A set-associative cache decreases the number of instances where the program is required to return to the main memory. This is because a number of instruction caches hold instructions corresponding to a number of different segments of a computer program. Thus, the speed at which the processor executes a program increases since there is a greater chance that the processor can find a desired instruction in the set-associative cache.

A set-associative cache also has disadvantages. Because there are multiple tag memory banks, each tag memory bank must be accessed to determine if a tag which is resident in that bank matches the corresponding upper bits contained in the program counter. In the present example, each tag memory bank must be accessed to determine whether it has a tag which matches the upper 22 bits in the program counter. Power is consumed each time a tag and an instruction are read from a tag memory bank and an instruction cache, respectively. For example, if the set-associative cache has two tag memory banks and two instruction caches, each time the processor accesses the set-associative cache, two instructions and two tags are read. Thereafter, at most a single tag is matched and an instruction corresponding to the matched tag is identified as the desired instruction. Thus, the power consumed in a set-associative cache increases as the number of tags read and the number of instructions read increase.

Thus, although a set-associative cache increases the speed with which the processor executes tasks, there is a corresponding increase in power consumption resulting from the reading of the additional tags and instructions from the additional sets of instruction caches and tag memory banks. Using the example above, it can be seen that in addition to the power consumed from reading and comparing the four tags, power is consumed reading four instructions, although at most only one of the instructions will be the desired instruction.

Thus, it can be seen that there is a need in the art for a method to implement a set-associative cache which maintains the advantages discussed above, such as increased operating speed, while at the same time reducing the additional power consumption inherent in a set-associative cache.

SUMMARY OF THE INVENTION

The present invention is directed to apparatus and method for reducing power consumption in a cache. The invention's set-associative cache maintains the advantages of increased operating speed, while at the same time reducing the power consumption inherent in a set-associative cache.

According to the present invention, a power reduction signal (also called a "same block" signal in the present application) is generated. The power reduction signal indicates whether a subsequent instruction to be fetched from an instruction cache belongs in the same block as a previous instruction fetched from the same instruction cache. When the subsequent instruction belongs to the same block as the previous instruction, there is no need to perform a tag read or an instruction read from an instruction cache other than the same instruction cache which contains the block to which the subsequent instruction belongs. Since the number of tag reads and instruction reads are dramatically reduced, the power consumption in the cache is also significantly reduced.

In one embodiment, the power reduction signal is generated by a logical combination of an increment address signal and a signal indicating if a block boundary has been crossed.

DETAILED DESCRIPTION OF THE INVENTION

The present invention is directed to an apparatus and method for reducing power consumption in a cache. Although the invention is described with respect to specific embodiments, the principles of the invention, as defined by the claims appended herein, can obviously be applied beyond the specifically described embodiments of the invention described herein. Moreover, in the description of the present invention, certain details have been left out in order to not obscure the inventive aspects of the invention. The details left out are within the knowledge of a person of ordinary skill in the art.

The drawings in the present application and their accompanying detailed description are directed to merely example embodiments of the invention. To maintain brevity, other embodiments of the invention which use the principles of the present invention are not specifically described in the present application and are not specifically illustrated by the present drawings.

The embodiments of the present invention discussed below are described by reference to an "instruction cache" as opposed to a "data cache." However, the principles of the invention apply equally to a "data cache" which holds data instead of instructions. As such, in the present application the term "cache," when used by itself, can generally refer to either an instruction cache or a data cache.

An instruction cache can potentially contain an instruction that the processor currently needs. As discussed above, one way to determine if an instruction is already resident in the instruction cache is to keep track of the addresses of the instructions when the instructions are first brought into the instruction cache from main memory.

A typical method of keeping track of where the instructions are located in the instruction cache is to use a number of the bits in the instruction address (also referred to as the "instruction address") to "map" alocation within the instruction cache where the instruction will be stored. These bits are usually referred to as the index and the offset. In addition, because there are many addresses in the main memory that can potentially be mapped to the same location in the instruction cache using just the index and offset, a further number of bits of the instruction address are used as a "tag" to ensure that the instruction in the instruction cache location designated by the index and offset is indeed the instruction needed by the processor. This mapping method for the instruction cache is discussed in detail below.

Figure 1:
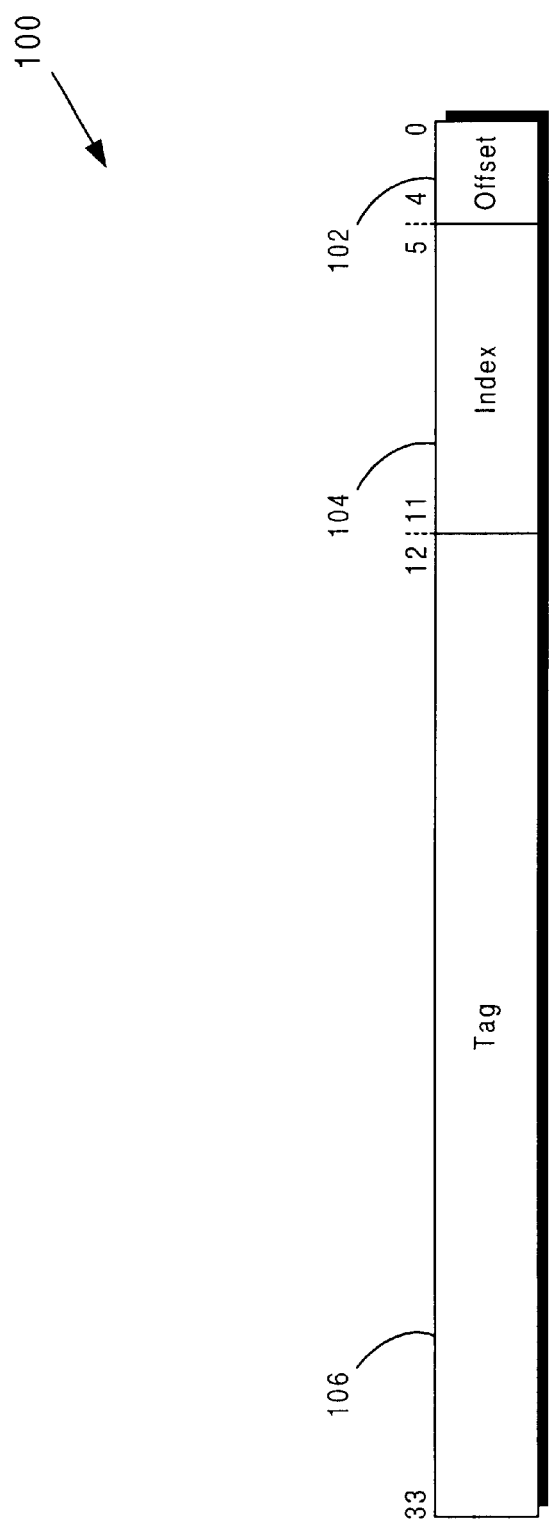
FIG. 1 illustrates the composition of a main memory address.

FIG. 1 shows instruction address 100 (also referred to as "instruction address 100") which comprises offset 102, index 104, and tag 106. In the present embodiment, tag 106 comprises 22 bits, index 104 comprises 7 bits, and offset 102 comprises 5 bits. As an instruction is first brought into the set-associative cache, a copy is made of the upper 22 bits of instruction address 100. This copy is then stored in a tag memory bank location within the set-associative cache that is mapped by index 104. The tag memory bank location where the copy is to be stored corresponds to a unique 7-bit pattern of index 104. These 7 bits can be decoded to map any one of 128 tag memory bank locations ($2^7$=128) and the tag can be stored in that tag memory bank location.

A typical instruction cache within a set-associative cache stores a number of sequential instructions, also referred to as a "block of instructions," together in a group of "instruction locations" within the instruction cache. This group of instruction locations is also referred to as a "block." Thus, a block will contain sequential program instructions located in sequential instruction locations.

In addition to mapping the tag memory bank location, index 104 is also used to map the instruction cache block where the instruction associated with the tag will be stored. In the present example, the 7 bits of index 104 can be decoded to map any one of 128 instruction cache blocks. As discussed above, in a typical instruction cache, each block comprises a number of instruction locations, for example 32 instruction locations. In the present embodiment, by decoding a unique 5 bit pattern of offset 102, any one of 32($2^5$=32) instruction locations may be mapped within the block mapped by index 104, and the instruction can be stored in that instruction location. Thus, the exact location of an instruction in the instruction cache is mapped using both the index and offset of instruction memory address 100.

Figure 2:
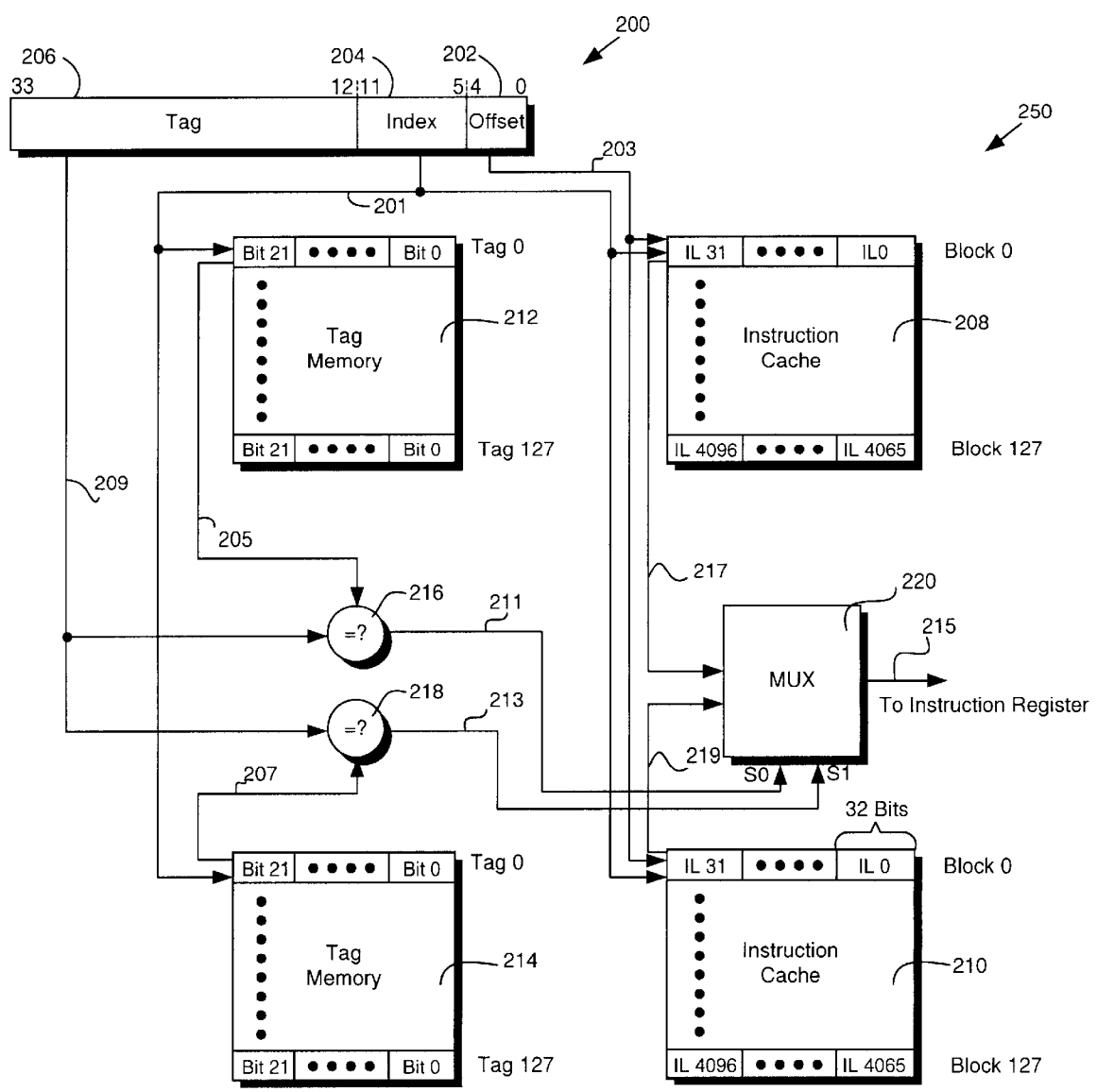
FIG. 2 illustrates a typical 2-way set-associative cache along with a main memory address.

Therefore, it is seen that the instruction address of an instruction needed by the processor may be used to determine whether that instruction is already resident in the instruction cache by comparing certain bits of the instruction address with the tags previously stored in the tag memory bank locations. As stated above, in the present embodiment, the 22 upper bits of the instruction address are used as a "tag." FIG. 2 shows typical set-associative cache 250, along with instruction address 200. Set-associative cache 250 is a 2-way set-associative cache since it is comprised of two instruction caches, instruction cache 208, and instruction cache 210. Set-associative cache 250 further comprises two tag memory banks, tag memory 212, and tag memory 214. Set-associative cache 250 further comprises two comparators, comparator 216 and comparator 218, and multiplexer 220, also referred to as MUX 220.

Instruction address 200 is bused to set-associative cache 250 from the program counter (not shown in any of the Figures), to determine whether the instruction corresponding to instruction address 200 is resident in set-associative cache 250. Instruction address 200 comprises offset 202, index 204, and tag 206. In the present embodiment, tag 206 comprises 22 bits, index 204 comprises 7 bits, and offset 202 comprises 5 bits.

In the example shown in FIG. 2, instruction caches 208 and 210 each comprise 128 blocks of instructions, block 0 through block 127. Each block contains 32 instructions, each instruction being 32 bits wide. Each instruction resides in a particular "instruction location," also referred to as "IL" in the present application. As examples, block 0 in instruction cache 208 comprises 32 instruction locations, referred to as IL 0 through IL 31, and block 127 in instruction cache 208 also comprises 32 instruction locations, referred to as IL 4065 through IL 4096.

Tag memories 212 and 214 each comprise 128 tags, referred to as tag 0 through tag 127. Each tag is stored in a particular tag memory bank location, each tag memory bank location being capable of storing a tag having 22 bits. As an example, tag 0 in tag memory 212 comprises 22 bits; i.e. bit 0 through bit 21.

Index 204 of instruction address 200 comprises 7 bits whose pattern can be decoded to determine which one of 128 tag memory bank locations within each of tag memories 212 and 214 contains the tag to be compared with tag 206 of instruction address 200. The same pattern of 7 bits in index 204 will be decoded to determine the blocks within each of instruction caches 208 and 210 where the instructions corresponding to the tags are located. In addition, the unique 5 bit pattern of offset 202 will be decoded to determine the exact instruction locations within the blocks where the instructions corresponding to the tags are located.

Since this is a typical 2-way set-associative cache, the desired instruction may be located in either instruction cache 208 or instruction cache 210. Thus, the tags in both tag memory bank locations corresponding to the unique 7 bit pattern of index 204, and the instructions in both instruction locations corresponding to the unique bit pattern of index 204 and offset 202 are read and the tags are then compared to tag 206 of instruction address 200. This process of accessing the tags and instructions, reading them, and comparing the tags is discussed in greater detail below.

The illustration of instruction address 200 in FIG. 2 shows the mapping relationship between instruction address 200 and set-associative cache 250. In the present example, instruction address 200 is bused to set-associative cache 250 from the program counter. After instruction address 200 is bused into set-associative cache 250, index 204 is decoded to determine the tag memory bank locations and instruction cache is blocks that correspond to the unique 7 bit pattern of index 204. This process is represented by the directed line referred to by numeral 201. Thus it is seen by following directed line 201 from index 204 of instruction address 200 that tag 0 of tag memory 212, tag 0 of tag memory 214, block 0 of instruction cache 208, and block 0 of instruction cache 210 are all pointed to by index 204.

Offset 202 is decoded in a manner known in the art to determine the instruction locations within block 0 of both instruction cache 208 and instruction cache 210 that correspond to the unique 5 bit pattern of offset 202. This process is represented by the directed line referred to by numeral 203. Thus it is seen by following directed line 203 from offset 202 of instruction address 200 that an instruction location within block 0 of instruction cache 208 and an instruction location within block 0 of instruction cache 210 are pointed to by offset 202. In the present example, tag 0 from tag memory 212, tag 0 from tag memory 214, an instruction in block 0 of instruction cache 208, and an instruction in block 0 of instruction cache 210 are read.

Directed lines 205, 207 and 209 represent the next step in the process. Tag 206 of instruction address 200 is compared with tag 0 of tag memory 212 by comparator 216. Simultaneously, tag 206 of instruction address 200 is compared with tag 0 of tag memory 214 by comparator 218. The outputs of comparators 216 and 218 are represented by directed lines 211 and 213, respectively. Directed lines 211 and 213 show that the outputs of comparators 216 and 218, i.e. the results of the comparisons, are communicated to select lines S0 and S1 of NfUX 220. If there is a hit resulting from the comparison performed by comparator 216, i.e. if the 22 bits of tag 206 of instruction address 200 and the 22 bits of tag 0 of tag memory 212 are identical, then select line S0 will enable MUX 220 to pass an instruction from an instruction location in block 0 of instruction cache 208 to output 215 of MUX 220. The instruction read from the instruction location in block 0 of instruction cache 208 is present at a first input of MNUX 220 as indicated by directed line 217. That particular instruction, i.e. the instruction read from the instruction location in block 0 of instruction cache 208, is thus passed to output 215 of MUX 220 and into an instruction register (not shown in any of the Figures) for use by the processor.

Similarly, if the 22 bits of tag 206 of instruction address 200 and the 22 bits of tag 0 of tag memory 214 are all the same, select line S1 will enable MUX 220 to pass the instruction read from an instruction location in block 0 of instruction cache 210 present at a second input of MUX 220, and indicated by directed line 219, to output 215 of MUX 220 and into an instruction register for use by the processor. If neither compare operation results in a hit, i.e. the desired instruction is not in either instruction cache 208 or instruction cache 210, then neither select line S0 nor select line S1 will enable MUX 220. As such, neither an instruction from instruction cache 208 nor an instruction from instruction cache 210 will pass to output 215 of MUX 220.

Typical set-associative cache 250 will determine, using the procedure described above, if the desired instruction is in the instruction cache. However, as was illustrated above, the procedure requires the reading of two tags and two instructions, comparing the two tags, and busing the instruction associated with the tag that resulted in a "hit" to the instruction register. This process results in significant power consumption associated with the two tag read operations and the two instruction read operations. As discussed below, the present invention significantly reduces the power consumed in the set-associative cache.

Figure 3:
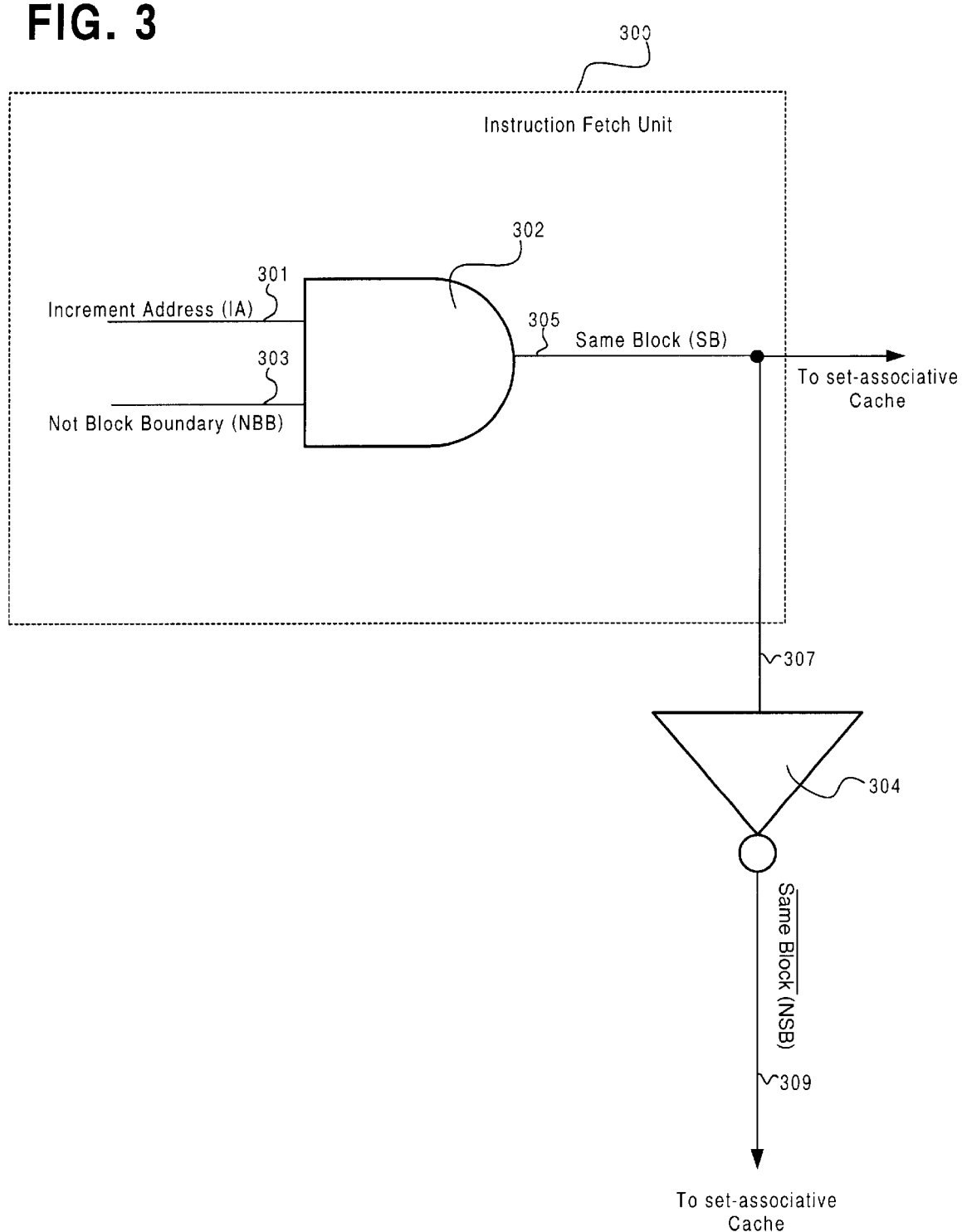
FIG. 3 illustrates a portion of an instruction fetch logic within an instruction fetch unit.

FIG. 3 shows a portion of instruction fetch unit 300 which has been modified according to one embodiment of the present invention. AND gate 302 is shown as having Increment Address (also referred to as "IA") input 301 and Not Block Boundary (also referred to as "NBB") input 303. To illustrate the function of IA input 301 and by way of background, the instruction address determined by instruction fetch unit 300 and to be bused into the program counter depends on the current state of the processor. Often, the instruction address determined by the instruction fetch logic unit is simply the address currently contained in the program counter incremented by one. This incremented address is obtained by passing the current address in the program counter through logic that increments the address by one. The incremented address is then bused back to the program counter. The signal in instruction fetch unit 300 designating whether the desired instruction address is the incremented address currently in the program counter is the IA signal which, according to the invention, is brought to input 301 of AND gate 302. Thus, when the IA signal is high, the address of the desired instruction is the current address contained in the program counter, incremented by one.

NBB ("Not Block Boundary") input 303 is generated by the present invention to indicate when the block boundary of a block of instructions has not been "crossed." The block boundary is not crossed when the next instruction to be fetched is within the same block of instructions as the instruction which was just fetched from the instruction cache. Referring to FIG. 2 and by way of example, suppose that tag 206, index 204, and offset 202 of the current address contained in the program counter identify instruction location 0 (i.e. "IL 0") in block 0 of instruction cache 208 as the desired instruction. Suppose further that during the next fetch cycle, the instruction fetch logic determines that the next instruction is located at the current address in the program counter, incremented by one. Thus, the instruction in IL 1 of block 0 of instruction cache 208 will be identified by tag 206, index 204, and offset 202 of the incremented address.

If during the next fetch cycle the incremented address mode is selected again by the instruction fetch logic, the address in the program counter will again be incremented by one. Thus, IL 2 of block 0 of instruction cache 208 will be identified as the desired instruction. This process may continue until the end of block 0, i.e. IL 31 of block 0, in cache 208 is reached, or until the instruction fetch logic determines that the address of the desired instruction is to be obtained by a method other than incrementing the current address contained in the program counter. When the desired instruction is located in the same block of instruction cache 208, the block boundary is not crossed and signal NBB at input 303 of AND gate 302 remains high.

One way to generate NBB input 303 is by checking the least significant bit in index 204. In the present example, the least significant bit in index 204 is bit 5 in instruction address 200. Whenever the least significant bit of index 204 toggles (from "0" to "1" or vice versa), the addressed block in the instruction cache changes. As such, when the least significant bit of index 204 remains unchanged, NBB input 303 remains a "1", otherwise NBB input 303 will be a "0". As stated above, one way to generate NBB input 303 is by checking the least significant bit in index 204. For example, the current value and the previous value of the least significant bit in index 204 can be XNOR'ed (i.e. Exclusive NOR'ed) and the result of the XNOR operation would be a "1" when there is no change in the least significant bit in index 204. If the least significant bit of index is 204 changes, the result of XNOR operation will be a "0".

Referring to the portion of instruction fetch unit 300 shown in FIG. 3, the output of AND gate 302, i.e. "Same Block" signal 305 ("SB") is high when both IA input 301 and NBB input 303 are high. A logical "1" at SB 305 indicates that the instruction to be fetched is in the same block as a previous instruction. Since the instructions in a same block are placed in the same instruction cache when the instruction cache is being built, the fact that the instruction to be fetched is in the same block as the previous instruction means that the instruction to be fetched is in the same instruction cache as the previous instruction. Thus, when SB 305 is high, a subsequent instruction to be fetched is in the same instruction cache as a previous instruction. In the present application, signal SB 305 is also referred to generally as a "power reduction signal."

It is noted that it is necessary not only to ensure that NBB input 303 is high but also to ensure that IA input 301 is high. In other words, it is necessary to ensure that the address of the desired instruction is obtained by incrementing the current address contained in the program counter by one. The reason is that NBB input 303 may be a "1" and yet the desired instruction does not even reside in the instruction cache. This can occur, for example, when the least significant bit of index 204 remains unchanged yet the tag bits (i.e. bits 12 through 33 in the present example) change due to a "Jump" to instruction. Thus, it is important to ensure that the address of the desired instruction is determined in the increment address mode, i.e. by incrementing the current program counter. In this manner, the tag bits are known to be the same as the tag bits corresponding to the previous instruction fetched from the instruction cache.

As discussed above, signal SB 305 indicates that the desired instruction is in the same block of the instruction cache from which the previous instruction was fetched. As shown in FIG. 3, signal "Not Same Block" (or "NSB") 309 is obtained by inverting SB 305. Signals SB 305 and NSB 309, which are generated according to one embodiment of the invention in the manner explained above, are routed to the set-associative instruction cache of the present invention, one embodiment of which is shown in FIG. 4.

Figure 4:
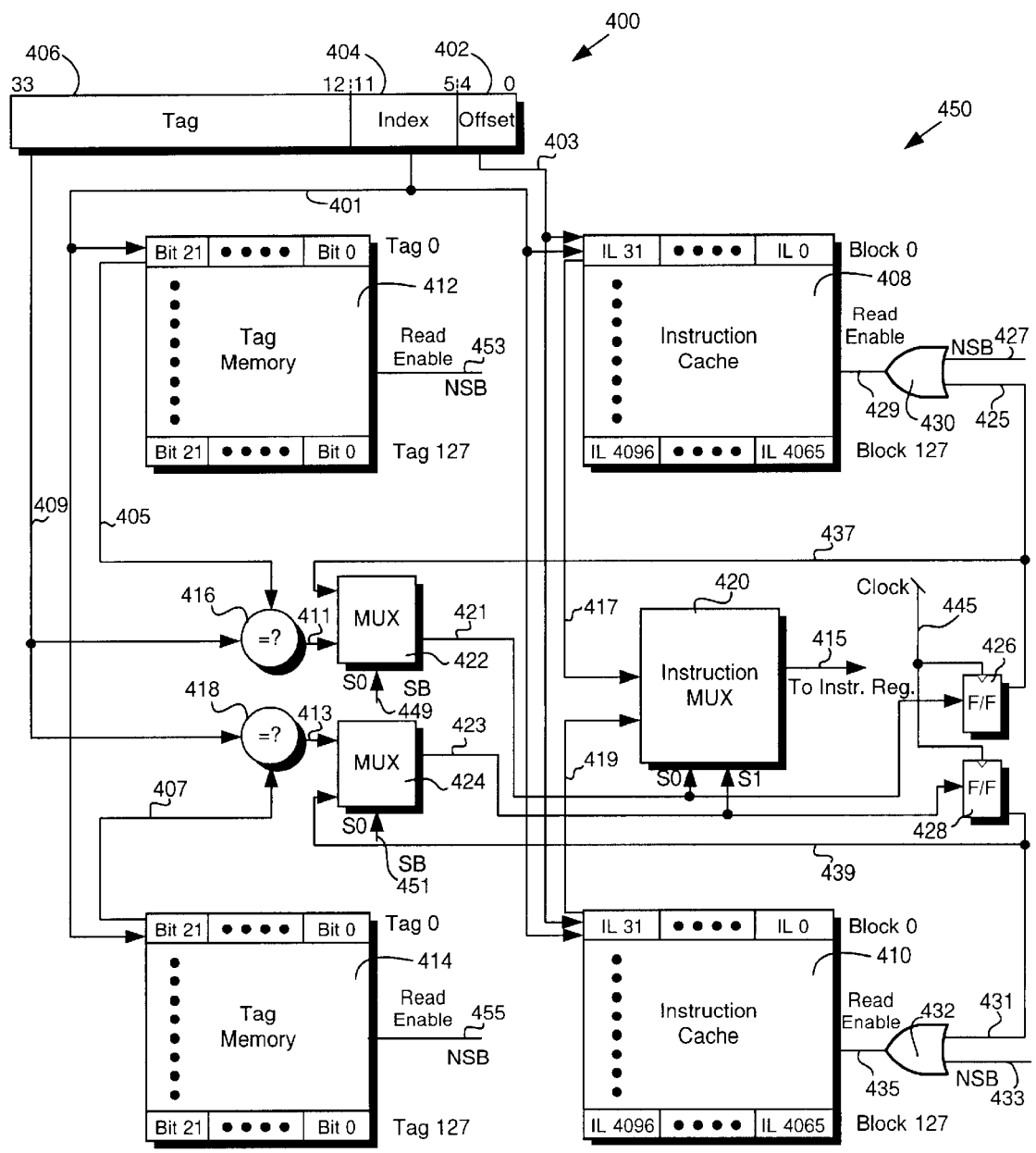
FIG. 4 illustrates a 2-way set-associative cache along with a main memory address, in accordance with one embodiment of the present invention.

FIG. 4 shows set-associative cache 450 along with instruction address 400, in accordance with one embodiment of the present invention. In this embodiment, set-associative cache 450 is a 2-way set-associative cache, i.e. set-associative cache 450 is comprised of two instruction caches, instruction cache 408, and instruction cache 410. Set-associative cache 450 further comprises two tag memory banks, tag memory 412, and tag memory 414. In the present application, tag memory 412 and tag memory 414 are also referred to as tag memory banks. Set-associative cache 450 also comprises two comparators, comparator 416 and comparator 418, and instruction multiplexer 420, also referred to as "instruction MUX 420."

In this embodiment, set-associative cache 450 includes multiplexer 422, also referred to as MUX 422, and multiplexer 424, also referred to as MUX 424, and two flip-flops, flip-flop 426, also referred to as FF 426, and flip-flop 428, also referred to as FF 428. Set-associative cache 450 also includes two logic gates, OR gate 430, and OR gate 432.

The "read enable" lines of tag memory 412 and tag memory 414, referred to by numerals 453 and 455, respectively, are used to enable or disable the tag read operation based on the current logical state of the NSB signal. When NSB is a logical "1," read enable lines 453 and 455 are also a logical "1" and respective tag memories 412 and 414 can be read. When NSB is a logical "0," read enable lines 453 and 455 are also a logical "0" and respective tag memories 412 and 414 can not be read.

Similarly, the read enable lines of instruction cache 408 and instruction cache 410, referred to by numerals 429 and 435, respectively, are used to enable or disable the instruction read operation based on the logical state of two signals. The first signal is NSB, which is present on respective first inputs 427 and 433 of OR gate 430 and OR gate 432. The second signal comes from the respective outputs of FF 426 and FF 428 which are present on respective second inputs 425 and 431 of OR gate 430 and OR gate 432.

When either the first or the second input of OR gates 430 and 432 is a logical "1," the respective outputs of OR gates 430 and 432, i.e. enable lines 429 and 435 respectively, will be a logical "1" and respective instruction caches 408 and 410 can be read. Also when both the first and the second inputs of OR gates 430 and 432 are a logical "1," the respective outputs of OR gates 430 and 432, i.e. enable lines 429 and 435 respectively, will be a logical "1" and respective instruction caches 408 and 410 can be read. When both the respective first and second inputs of OR gates 430 and 432 are a logical "0," the respective outputs of OR gates 430 and 432, i.e. enable lines 429 and 435 respectively, will be a logical "0" and respective instruction caches 408 and 410 cannot be read.

In the discussion below, it will be assumed that a first instruction in a new block is being addressed and fetched. This state will be referred to in the present application as the "initial instruction fetch cycle." Thus, referring again to FIG. 3, since an instruction in a new block is being addressed, NBB signal at input 303 of AND gate 302 is a logical "0". Therefore, signal SB 305 at the output of AND gate 302 will be a logical "0" and NSB 309 will be a logical "1."

Referring again to FIG. 4, since NSB is a logical "1," both tag memories 412 and 414 have a logical "1" on their respective read enable lines 453 and 455 and therefore can be read. Similarly, since NSB is a logical "1" on respective first inputs 427 and 433 of OR gates 430 and 432, a logical "1" is present on respective read enable lines 429 and 435 at the respective outputs of OR gates 430 and 432, and both instruction caches 408 and 410 can be read.

Continuing with the initial instruction fetch cycle, instruction address 400 in FIG. 4 is bused to set-associative cache 450 from the program counter to determine whether the desired instruction is resident in set-associative cache 450. In the present embodiment, instruction address 400 comprises offset 402, index 404, and tag 406. In this example, tag 406 comprises 22 bits, index 404 comprises 7 bits, and offset 402 comprises 5 bits.

Each instruction cache 408 and 410 comprises 128 blocks of instruction locations, block 0 through block 127. Each instruction block contains 32 individual instruction locations, each instruction location being capable of storing an instruction which is 32 bits wide. As examples, block 0 in instruction cache 408 comprises 32 instruction locations, referred to as IL 0 through IL 31 and block 127 in instruction cache 408 also comprises 32 instruction locations, referred to as IL 4065 through IL 4096. Tag memories 412 and 414 each comprise 128 tag memory bank locations, referred to as tag 0 through tag 127. Each tag memory bank location is capable of storing a tag having 22 bits. As an example, tag 0 in tag memory 412 can store a tag containing 22 bits, bit 0 through bit 21.

In this example, index 404 of instruction address 400 comprises 7 bits whose pattern can be decoded to determine which one of the 128 tags within each of tag memories 412 and 414 is to be compared with tag 406 of instruction address 400. The same pattern of 7 bits in index 404 will be decoded to determine which one of the 128 blocks within each of instruction caches 408 and 410 corresponds to the tags to be compared. In addition, the unique 5 bit pattern of offset 402 will be decoded to determine the particular instruction locations within the blocks that correspond to the tags to be compared.

During the initial instruction fetch cycle, the desired instruction may be located in either instruction cache 408 or instruction cache 410. Thus, one tag from tag memory 412 and one tag from tag memory 414 corresponding to the unique bit pattern of index 404 must be read for comparison to tag 406 in instruction address 400. Moreover, one instruction from an instruction location in instruction cache 408 and one instruction from an instruction location in instruction cache 410 corresponding to the unique bit patterns of index 404 and offset 402 need be read.

It is recalled that instruction address 400 is bused to set-associative cache 450 from the program counter. After instruction address 400 is bused into set-associative cache 450, index 404 is decoded in a manner known in the art to determine the tags and instruction blocks which correspond to the unique bit pattern of index 404. This process is represented by the directed line 401. In the present example, it is seen by following directed line 401 from index 404 of instruction address 400 that tag 0 of tag memory 412, tag 0 of tag memory 414, block 0 of instruction cache 408, and block 0 of instruction cache 410 all correspond to the unique bit pattern of index 404.

Offset 402 is also decoded in a manner known in the art to determine the instruction location within block 0 of instruction cache 408 and block 0 of instruction cache 410 which correspond to the unique bit pattern of offset 402. This process is represented by the directed line 403. Thus, it is seen by following directed line 403 from offset 402 of instruction address 400 that an instruction location within block 0 of instruction cache 408 and an instruction location within block 0 of instruction cache 410 correspond to the unique bit pattern of offset 402.

Tag 0 of tag memory 412 and the tag 0 of tag memory 414 and an instruction from block 0 of instruction cache 408 and an instruction from block 0 of instruction cache 410 are then read. Directed lines 405, 407 and 409 represent the next step in the process. Tag 406 of instruction address 400 is compared with tag 0 of tag memory 412 by comparator 416. Simultaneously, tag 406 of instruction address 400 is compared with tag 0 of tag memory 414 by comparator 418.

The outputs of comparators 416 and 418 are represented by directed lines 411 and 413, respectively. Directed lines 411 and 413 show that the outputs of comparators 416 and 418, i.e. the results of the tag comparisons, are communicated to respective first inputs of MUX 422 and MUX 424. If there is a "hit" (i.e. a match) resulting from the comparison performed by comparator 416, i.e. if the 22 bits of tag 406 of instruction address 400 and the 22 bits of tag 0 of tag memory 412 are identical, then a logical "1" will be present at the first input of MUX 422. Otherwise, a logical "0" will be present at the first input of MUX 422. If there is a "hit" (i.e. a match) resulting from the comparison performed by comparator 418, then a logical "1" will be present at the first input of MUX 424. Otherwise, a logical "0" will be present at the first input of MUX 424.

Directed lines 437 and 439 show that the outputs of FF 426 and FF 428 are communicated to respective second inputs of MUX 422 and MUX 424. Whatever logical state is present at the respective outputs of FF 426 and FF 428 will be present on the respective second inputs of MUX 422 and MUX 424.

There is a respective select line for MUX 422 and MUX 424. These select lines are represented by directed lines 449 and 451, respectively. These select lines have the same logical state as the SB signal. If SB is a logical "1," then MUX 422 and MUX 424 will pass to their respective outputs whatever logical state is present on directed lines 437 and 439, respectively. If SB is a logical "0," then MUX 422 and MUX 424 will pass to their respective outputs whatever logical state is present on directed lines 411 and 413, respectively. As discussed above, during the initial instruction fetch cycle, SB will be a logical "0." Thus, the logical state present on lines 411 and 413, i.e. the output of comparators 416 and 418, respectively, will be passed through MUX 422 and MUX 424 during the initial instruction fetch cycle.

The respective outputs of MUX 422 and MUX 424 are represented by directed lines 421 and 423. Directed lines 421 and 423 show that the respective outputs of MUX 422 and MUX 424 are communicated to select lines S0 and S1 of instruction MUX 420. If there is a logical "1" on directed line 421, then select line S0 will enable instruction MUX 420 to pass the instruction that was read from the instruction location in block 0 of instruction cache 408 and that is present at a first input of instruction MUX 420, represented by directed line 417, to the output of instruction MUX 420, represented by directed line 415, and into an instruction register (not shown in FIG. 4) for use by the processor. If there is a logical "1" on directed line 423, then select line S1 will enable instruction MUX 420 to pass the instruction that was read from the instruction location in block 0 of instruction cache 410 and that is present at a second input of instruction MUX 420, represented by directed line 419, to the output of instruction MUX 420, represented by directed line 415, and into an instruction register.

The respective outputs of MUX 422 and MUX 424 are also communicated to the respective inputs of FF 426 and FF 428. FF 426 and FF 428 are clocked by clock 445.

Thus, it can be seen that during the initial instruction fetch cycle, the process of determining whether the desired instruction is resident in the set-associative cache proceeds in a manner similar to the typical set-associative cache described in relation to FIG. 2, i.e. two instructions are read and two tags are read and compared.

It is during the instruction fetch cycles subsequent to the initial instruction fetch cycle that the power saving advantages of the invention are realized. Referring again to FIG. 3, if after the initial instruction fetch cycle the block boundary has not yet been reached, the instruction fetch logic will generate a logical "1" on the NBB input 303 to AND gate 302, indicating that a block boundary has not yet been reached. If the instruction fetch logic then selects the incremented address contained in the program counter as the address of the next desired instruction, IA input 301 to AND gate 302 will be a logical "1." Therefore, SB 305 at the output of AND gate 302 will be a logical "1" and the input to inverter 304 on line 307 will be a logical "1." Thus, the output of inverter 304 on line 309, i.e. the NSB signal, will be a logical "0."

Also, since the instruction fetch logic has selected the incremented address, the next instruction address to be placed in the program counter will be the next sequential instruction address following the current instruction address 400. This next instruction address will then be bused from the program counter to set-associative cache 450 and its index and offset will be decoded. The index and offset of this instruction address will determine the next instruction in the same block as the previous instruction fetched in the initial instruction fetch cycle.

Referring again to FIG. 4, since NSB is a logical "0," both tag memories 412 and 414 have logical "0's" on their respective read enable lines and therefore can not be read. In addition, since NSB is a logical "0" on respective first inputs 427 and 433 of OR gates 430 and 432, the respective outputs of OR gates 430 and 432 are dependent on the logical state of respective second inputs 425 and 431 of OR gates 430 and 432. Thus, it is seen that the respective outputs of OR gates 430 and 432, and therefore the read enable inputs of instruction cache 408 and instruction cache 410 on lines 429 and 435, respectively, are dependent on the respective outputs of FF 426 and FF 428.

FF 426 and FF 428 are clocked by system clock 445 as shown in FIG. 4. When FF 426 and FF 428 are clocked, the previous outputs of MUX 422 and MUX 424 that are present on the respective inputs of FF 426 and FF 428 will be passed to the respective outputs of FF 426 and FF 428. The respective outputs of FF 426 and FF 428 will in turn be present at the respective second inputs of MUX 422 and MUX 424, as represented by directed lines 437 and 439, respectively. The respective outputs of FF 426 and FF 428 will also be present at the respective second inputs of OR gate 430 and OR gate 432, as represented by directed lines 425 and 431, respectively.

It will be assumed for the purposes of the following discussion that during the initial instruction fetch cycle described above the output of comparator 416 was a logical "1" and the output of comparator 418 was a logical "0," i.e. tag memory 412 contains a tag that matched tag 406 of instruction address 400 during the initial instruction fetch cycle. It will further be assumed that the matching tag was tag 0 of tag memory 412. Therefore, during the initial instruction fetch cycle, the desired instruction associated with tag 0 in tag memory 412 was an instruction in block 0 of instruction cache 408.

Therefore, the output of FF 426 will be a logical "1," and the output of FF 428 will be a logical "0." Thus, a logical "1" will be present at the second input of MUX 422 and a logical "0" will be present at the second input of MUX 424. Similarly, a logical "1" will be present at the second input of OR gate 430 and a logical "0" will be present at the second input of OR gate 432. The output of OR gate 430 on line 429 will therefore be a logical "1" and instruction cache 408 can be read. The output of OR gate 432 on line 435 will be a logical "0" and instruction cache 410 cannot be read. Therefore, the instruction corresponding to the index and offset of the current instruction address in the program counter, which is located in block 0 of instruction cache 408 will be read and be present at the input of instruction MUX 420, as represented by directed line 417.

A logical "1" will be present on the select lines of both MUX 422 and MUX 424, because SB is now a logical "1." Therefore, as discussed above, MUX 422 and MUX 424 will pass to their respective outputs whatever logical state is present on directed lines 437 and 439, respectively. Therefore, a logical "1" will be present on the output of MUX 422 and a logical "0" will be present on the output of MUX 424. As discussed above, these logical states are communicated to select lines S0 and S1, respectively, of instruction MUX 420, and also to the respective inputs of FF 426 and FF 428 for use during the next instruction fetch cycle. Therefore, there will be a logical "1" on select line S0 of instruction MUX 420 during the next instruction fetch cycle. This will enable the instruction from block 0 of instruction cache 408 to be passed to the instruction register (not shown in FIG. 4) for use by the processor during the next instruction fetch cycle.

Thus, it is seen that if the incremented instruction address is selected by the instruction fetch logic and the block boundary has not yet been reached, the set-associative cache of the present invention reads only one instruction instead of reading two instructions and reading and comparing two tags. Tags do not need to be read and compared, since if the incremented instruction address is selected and a block boundary has not been reached, it will already be known that the desired instruction is located in set-associative cache 450. In addition, it will also already be known in which block of which instruction cache the desired instruction is located, i.e. the same block of the same instruction cache where the previous instruction was located. The reason is that instructions in a same block are initially brought into each instruction cache as a unit. As such, the fact that a desired instruction is in the same block as a previous instruction also indicates that the desired instruction is in the same instruction cache as the previous instruction.

Therefore, only one instruction needs to be read from a single instruction cache instead of two instructions from two instruction caches. Hence, in the present invention all read enable signals are disabled except the read enable signal associated with the instruction cache where the desired instruction resides.

As long as the increment address mode is selected by the instruction fetch logic and a block boundary has not been reached, the set-associative cache of the present invention will continue to have to read only one instruction per instruction fetch cycle instead of reading two instructions and reading and comparing two tags. When the instruction fetch logic deselects the incremented instruction address or the block boundary has been reached, SB will change to a logical "0" and the set-associative cache of the present invention will begin the process again with an initial instruction fetch cycle, allowing two tags to be read and compared and two instructions to be read.

Thus, the invention results in a significant reduction in power consumed in the set-associative cache since instead of reading two tags and two instructions, only a single instruction is read after the initial fetch cycle. It is manifest that the same power saving would result if data words are being fetched from a data cache as opposed to the instructions being fetched from an instruction cache which is used as an example in the present application. The reduction in power consumption achieved by the set-associative cache of the present invention becomes more significant as the number of sets or "ways" in the set-associative cache are increased. For example, in a typical four-way set-associative cache, four tags and four instructions are read during an instruction fetch cycle. In contrast, according to the invention, only a single instruction is read after the initial instruction fetch cycle.

In addition, the larger the block within the instruction cache, i.e. the more instruction locations contained in the block, the more advantageous the invention will be, since the invention will continue to read only one instruction for a larger number of instruction fetch cycles before the block boundary is reached and a new initial instruction fetch cycle is initiated. Finally, as the width of instructions continues to increase, the savings in power consumption achieved by the invention will be more dramatic. The reason is that the power consumed during each instruction read operation increases as the number of bits in each instruction, i.e. the width of each instruction, increases. Therefore, it is seen that the invention maintains the advantages of a set-associative cache, such as increased operating speed, while at the same time reducing the power consumption inherent in a set-associative cache.

From the above description of the invention it is manifest that various techniques can be used for implementing the concepts of the present invention without departing from its scope. Moreover, while the invention has been described with specific reference to certain embodiments, a person of ordinary skill in the art would recognize that changes can be made in form and detail without departing from the spirit and the scope of the invention. For example, although the invention has been described with reference to an "instruction cache," the principles of the invention apply equally to a "data cache" which holds data instead of instructions. Moreover, the principles of the invention apply to any memory module that can benefit from the teachings in accordance with the present invention to save power, whether or not the memory module is used as a cache or is called a cache. The described embodiments are to be considered in all respects as illustrative and not restrictive. It should also be understood that the invention is not limited to the particular embodiments described herein, but is capable of many rearrangements, modifications, and substitutions without departing from the scope of the invention.

Thus, apparatus and method for reducing power consumption in a cache have been described.

What is claimed is:

1. A processor comprising:

an instruction cache, said instruction cache comprising a plurality of blocks;

a circuit configured to generate a power reduction signal, said power reduction signal indicating if a subsequent instruction to be fetched is in a same block of said plurality of blocks as a previous instruction fetched from said instruction cache.

2. The processor of claim 1 wherein said power reduction signal enables and disables said instruction cache for reading said subsequent instruction from said instruction cache.

3. The processor of claim 1 wherein said subsequent instruction is read from said instruction cache when said power reduction signal is in a first logical state.

4. The processor of claim 1 wherein said power reduction signal is generated by a logical combination of an increment address signal and a signal indicating if a block boundary has been crossed.

5. The processor of claim 1 further comprising:

a tag memory bank coupled to said instruction cache, said tag memory bank comprising a plurality of tags.

6. The processor of claim 5 wherein said power reduction signal enables and disables said tag memory bank for reading a tag from said tag memory bank.

7. The processor of claim 6 wherein said tag from said tag memory bank is read for comparison with a plurality of bits in an instruction address when said power reduction signal is in a second logical state.

8. The processor of claim 7 wherein said tag from said tag memory bank is not read when said power reduction signal is in said first logical state.

9. A method for reducing power consumed in an instruction cache having a plurality of blocks, said method comprising steps of:

generating a power reduction signal to indicate if a subsequent instruction to be fetched is in a same block of said plurality of blocks as a previous instruction fetched from said instruction cache;

enabling said instruction cache for reading said subsequent instruction from said instruction cache when said power reduction signal is in a first logical state.

10. The method of claim 9 wherein said generating step comprises generating said power reduction signal by a logical combination of an increment address signal and a signal indicating if a block boundary has been crossed.

11. The method of claim 9 further comprising a step of enabling and disabling a tag memory bank for reading a tag from said tag memory bank, said tag memory bank being coupled to said instruction cache.

12. The method of claim 11 wherein said tag from said tag memory bank is read for comparison with a plurality of bits in an instruction address when said power reduction signal is in a second logical state.

13. The method of claim 11 wherein said tag from said tag memory bank is not read when said power reduction signal is in said first logical state.

\* \* \* \* \*